United States Patent [19]

Manfredo et al.

[11] 4,436,145

[45] Mar. 13, 1984

[54] CHARGE AIR COOLER MOUNTING ARRANGEMENT

[75] Inventors: Joseph N. Manfredo, Palos Verdes Estates; Selwyn R. Hirsch, Los Angeles, both of Calif.

[73] Assignee: The Garrett Corporation, Los Angeles, Calif.

[21] Appl. No.: 318,937

[22] Filed: Nov. 6, 1981

[51] Int. Cl.³ ............................ F28F 9/00; F28D 9/00
[52] U.S. Cl. .................................... 165/67; 165/162; 165/166; 123/563; 60/599
[58] Field of Search .................. 60/599; 123/563; 29/157.3 R; 165/67, 149, 162, 166, 153

[56] References Cited

U.S. PATENT DOCUMENTS

| | | | |
|---|---|---|---|
| 621,693 | 3/1899 | Morris | 29/157.3 R |
| 1,108,494 | 8/1914 | Feldkamp | 165/149 |
| 1,250,187 | 12/1917 | Jutrasch | 165/149 |
| 1,374,394 | 4/1921 | Ross | 180/68.4 |
| 1,500,560 | 7/1924 | Henderson | 29/153.7 R |
| 1,692,391 | 11/1928 | Stancliffe . | |
| 1,727,124 | 9/1929 | Lonsdale . | |
| 1,856,924 | 5/1932 | Modine | 165/67 |
| 2,308,119 | 1/1943 | Spieth | 165/149 |
| 2,348,020 | 5/1944 | Norris . | |
| 2,611,586 | 9/1952 | Collins . | |
| 2,846,197 | 8/1958 | Berg et al. . | |
| 2,863,645 | 12/1958 | Spieth | 165/162 |
| 2,927,877 | 3/1960 | Norman . | |
| 2,942,856 | 6/1960 | Woodward et al. . | |
| 3,196,937 | 7/1965 | Jenssen . | |
| 3,334,399 | 8/1967 | Teeguarden . | |
| 3,444,926 | 5/1969 | Stalberg . | |
| 3,610,331 | 10/1971 | Schreiber . | |
| 3,791,326 | 2/1974 | Schwarz | 29/153.7 R |
| 3,829,945 | 8/1974 | Kanzler et al. . | |
| 3,881,455 | 5/1975 | Belsanti | 123/563 |
| 4,191,148 | 3/1980 | Patel et al. | 123/563 |
| 4,303,052 | 12/1981 | Manfredo et al. | 165/149 |
| 4,330,030 | 5/1982 | Cate | 165/149 |

FOREIGN PATENT DOCUMENTS

| | | | |
|---|---|---|---|
| 2304883 | 8/1974 | Fed. Rep. of Germany | 165/67 |
| 507163 | 9/1920 | France | 165/149 |
| 635300 | 3/1928 | France . | |
| 890014 | 1/1944 | France . | |

OTHER PUBLICATIONS

"Engine Charge Air Cooler Nomenclature" SAE Recommended Practice J1148 (Jun. 1976); 1982 SAE Handbook, Society of Automotive Engineers, vol. 2, pp. 24.130-24.132.

Primary Examiner—William R. Cline
Assistant Examiner—John M. Kramer
Attorney, Agent, or Firm—Stuart O. Lowry; Albert J. Miller

[57] ABSTRACT

A charge air cooler is provided for mounting within the intake manifold of a combustion engine. The charge air cooler comprises a heat exchanger core formed by a plurality of relatively lightweight heat transfer elements defining a first flow path for charge air prior to ingestion of the charge air by the engine and a second flow path for a coolant in heat transfer relation with the charge air. The heat exchanger core supports at least one transversely extending rigid mounting sleeve for receiving a mounting bolt passed through a bolt-receiving hole in the intake manifold to secure the charge air cooler within the intake manifold.

24 Claims, 5 Drawing Figures

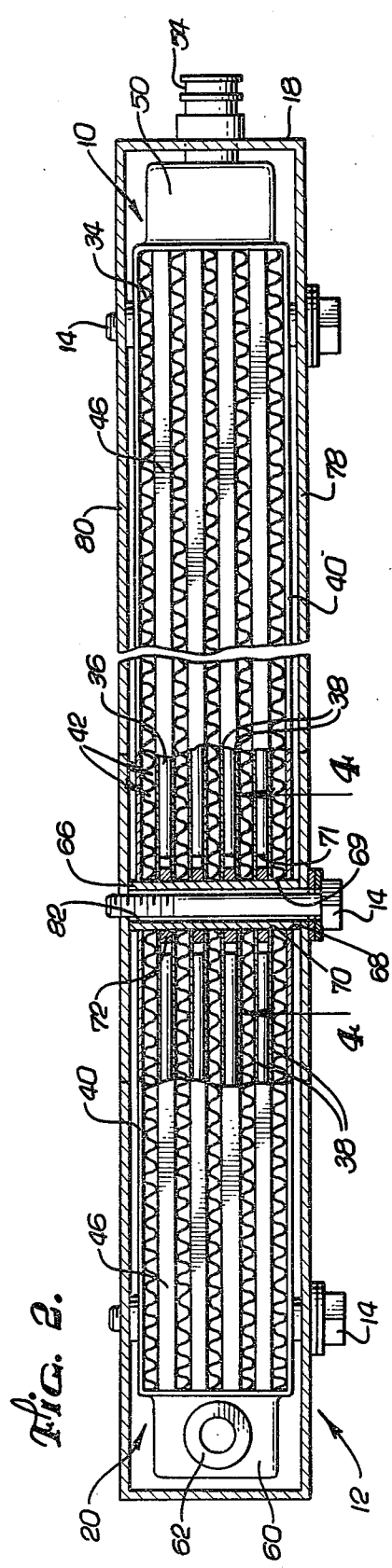
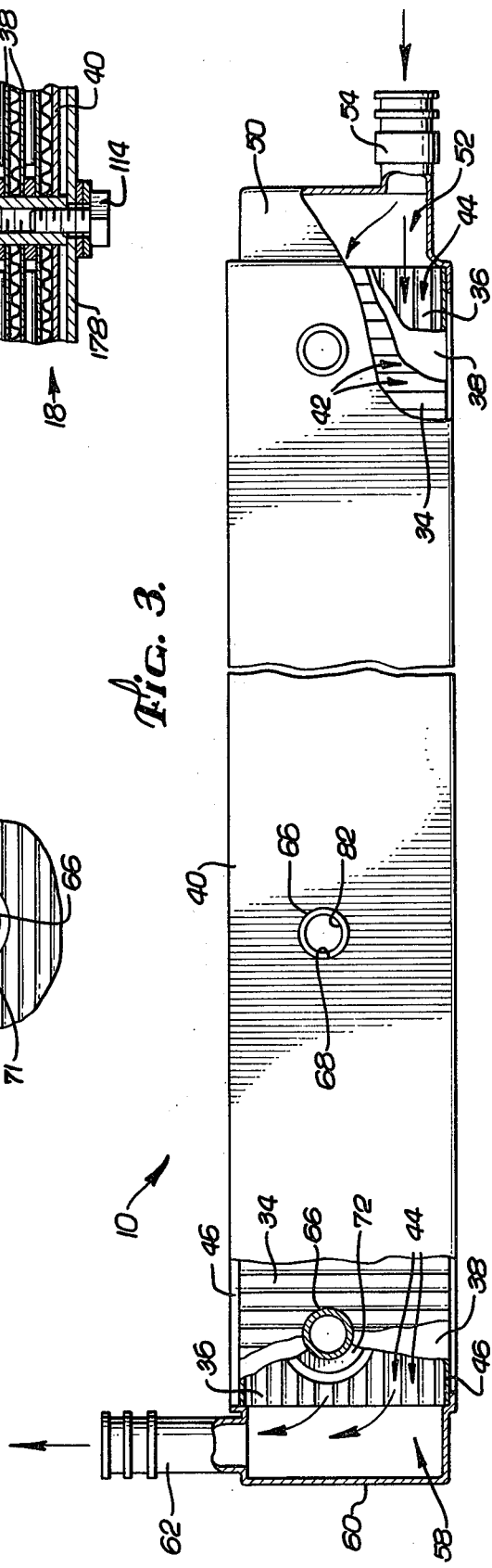

CHARGE AIR COOLER MOUNTING ARRANGEMENT

BACKGROUND OF THE INVENTION

This invention relates to heat exchangers of the type commonly referred to as charge air coolers for use in reducing the temperature of charge air supplied to a combustion engine. More specifically, this invention relates to an improved charge air cooler in conjunction with a simplified arrangement for mounting the charge air cooler securely into the intake manifold of a combustion engine.

Charge air cooler heat exchangers in general are known in the art and comprise a heat exchanger core mounted along the flow path of charge air supplied to a combustion engine. This charge air comprises ambient air which has been compressed by apparatus such as a supercharger or turbocharger to provide an increased mass flow of air to the engine to permit the engine to combust increased quantities of fuel and thereby operate at an increased level of power and performance. However, compression of the ambient air also elevates the air temperature such that the charge air has a relatively high temperature which, if not reduced, undesirably increases the total engine heat load. It is therefore desirable to cool the charge air prior to supply thereof to the engine. Charge air coolers are provided for this purpose and typically include a plurality of lightweight heat transfer elements defining flow paths to pass the charge air in heat transfer relation with a suitable coolant, such as ambient air or a liquid coolant, prior to ingestion of the charge air by the engine.

In many engine systems, it is both convenient and desirable to mount the charge air cooler directly into an intake manifold of the engine. In this configuration, the charge air passing through the intake manifold simultaneously passes through an air flow path in the charge air cooler immediately prior to ingestion by the engine. Suitable plumbing fixtures are provided for circulating the coolant through a separate flow path in the charge air cooler to controllably reduce the temperature of the charge air. For example, it is known to circulate liquid coolant from an engine-cooling radiator through the charge air cooler to reduce the temperature of the charge air.

According to conventional installation techniques, the charge air cooler is mounted within the intake manifold of the engine by a plurality of bolts which extend through opposite sides of the manifold and are fastened into appropriate threaded structures carried on the opposite sides of the charge air cooler. However, this mounting technique requires the charge air cooler to include relatively thick and structurally rigid side plates capable of supporting the bolt-receiving threaded structures and of accommodating mounting forces applied to the cooler by the mounting bolts. These thick side plates increase the overall weight and cost of the cooler and have a coefficient of thermal expansion somewhat different from that of the relatively thin and lightweight heat transfer elements defining the fluid flow paths. As a result, the charge air cooler is subjected to relatively high mechanical and thermal stresses during use wherein these stresses tend to reduce the overall operating life of the cooler. In addition, the relatively thick side plates occupy a significant portion of the charge air cooler volume which could otherwise be occupied by heat transfer elements to improve heat transfer capability.

In most combustion engine systems, the intake manifold is mounted closely alongside the engine thereby making access to the charge air cooler mounting bolts extremely difficult at one side of the intake manifold. For example, the intake manifold typically includes an outboard wall facing away from the engine whereby the mounting bolts fastened therethrough are accessible and an inboard wall facing toward the engine whereby the mounting bolts fastened therethrough are substantially inaccessible when the intake manifold is mounted on the engine. Accordingly, the charge air cooler is not easily mounted within the intake manifold when the intake manifold is mounted on the engine. Instead, the charge air cooler is first bolted into the intake manifold and then the cooler-manifold assembly is bolted as a unit on to the engine. Unfortunately, the combined size and weight of the cooler-manifold assembly makes this procedure extremely difficult and time consuming and thereby results in a substantial increase in manufacturing costs.

The present invention overcomes the problems and disadvantages of the prior art by providing an improved charge air cooler and mounting arrangement therefor wherein the charge air cooler is quickly and easily installed into an intake manifold already mounted on an engine and wherein the cooler includes structural members for receiving mounting bolts in the absence of relatively thick and structurally rigid side plates to minimize mechanical and/or thermal loading of heat transfer elements and to permit optimized use of heat transfer elements across the width of the cooler.

SUMMARY OF THE INVENTION

In accordance with the invention, a charge air cooler is provided for mounting into the intake manifold of a combustion engine. The charge air cooler comprises a heat exchanger core having a plurality of relatively lightweight heat transfer elements defining a first flow path for passage of charge air and a second flow path for passage of a coolant in close heat exchange relation with the charge air. The heat transfer elements support at least one transversely extending and structurally rigid mounting sleeve for receiving a mounting bolt to fasten the charge air cooler securely to the intake manifold. The mounting sleeve is sized and shaped such that mounting forces applied to the charge air cooler by the mounting bolt act upon the mounting sleeve substantially without any loading of the lightweight heat transfer elements.

According to a preferred form of the invention, the charge air cooler comprises a so-called plate-fin heat exchanger having a heat exchanger core defined by a plurality of first plate-fin elements arranged in an alternating stack with a plurality of second plate-fin elements, wherein the stacked plate-fin elements are separated from each other by a plurality of relatively thin and lightweight divider plates. The first plate-fin elements cooperate with the divider plates to form a plurality of generally parallel flow openings defining the first flow path for passage of the charge air, and the second plate-fin elements cooperate with the divider plates to form a plurality of generally parallel flow openings defining the second flow path for passage of the coolant generally at a right angle to the first flow path. Header bars are interposed between the divider plates at the longitudinal margins of the second plate-fin elements to isolate the flow paths from each other, and header tanks are provided at the opposite ends of the second plate-fin elements for respectively guiding the coolant for flow into and from the second flow path.

The components of the heat exchanger core are secured together as by a brazing process to form an integral structural unit. This structural unit has a size and shape for relatively close reception into an engine intake manifold with the plate-fin elements and the divider plates oriented generally in parallel with opposite walls of the manifold.

At least one structurally rigid mounting sleeve extends through the core transversely between the opposite walls of the manifold. This sleeve is secured to each one of the divider plates as by brazing to prevent leakage of fluid between the flow paths in the vicinity of the mounting sleeve. According to a preferred form of the invention, the sleeve is secured to a plurality of annular sealing rings carried about the sleeve and projecting radially outwardly therefrom between the divider plates for connection to the divider plates. Importantly, the mounting sleeve has a length to project slightly beyond the opposite exterior surfaces of the core.

The heat exchanger core is securely mounted within the intake manifold by a mounting bolt passed through a bolt-receiving hole in the manifold into the mounting sleeve. According to a preferred form of the invention, this mounting bolt is passed through a bolt-receiving hole in one wall of the manifold and further through the mounting sleeve for threaded reception into an aligned and threaded bolt-receiving hole in the opposite wall of the manifold. In this arrangement, the threaded hole is formed in the manifold wall at an inboard side of the manifold closely adjacent the engine such that access to the inboard side wall is not required to mount the cooler within the intake manifold. Importantly, the mounting bolt secures the charge air cooler with the manifold walls engaging the opposite ends of the mounting sleeve, whereby mechanical mounting forces are applied directly to the rigid mounting sleeve substantially without loading of the plate-fin elements or the divider plates.

In an alternative form, the mounting sleeve is internally threaded, and a pair of mounting bolts are fastened into the sleeve through aligned bolt-receiving holes formed in the opposite walls of the manifold.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2 is an enlarged fragmented top plan view of the charge air cooler installed within the intake manifold, with portions broken away to illustrate the mounting arrangement of this invention;

FIG. 3 is an enlarged fragmented side elevation of the charge air cooler, with portions broken away to illustrate the fluid flow paths therethrough in heat exchange relation with each other;

FIG. 4 is an enlarged vertical section taken generally on the line 4—4 of FIG. 2; and FIG. 5 is an enlarged fragmented horizontal section of a portion of a charge air cooler to illustrate an alternative arrangement for mounting the cooler within the intake manifold of a combustion engine.

DETAILED DESCRIPTION OF THE PREFERRED EMBODIMENT

Figure 1:
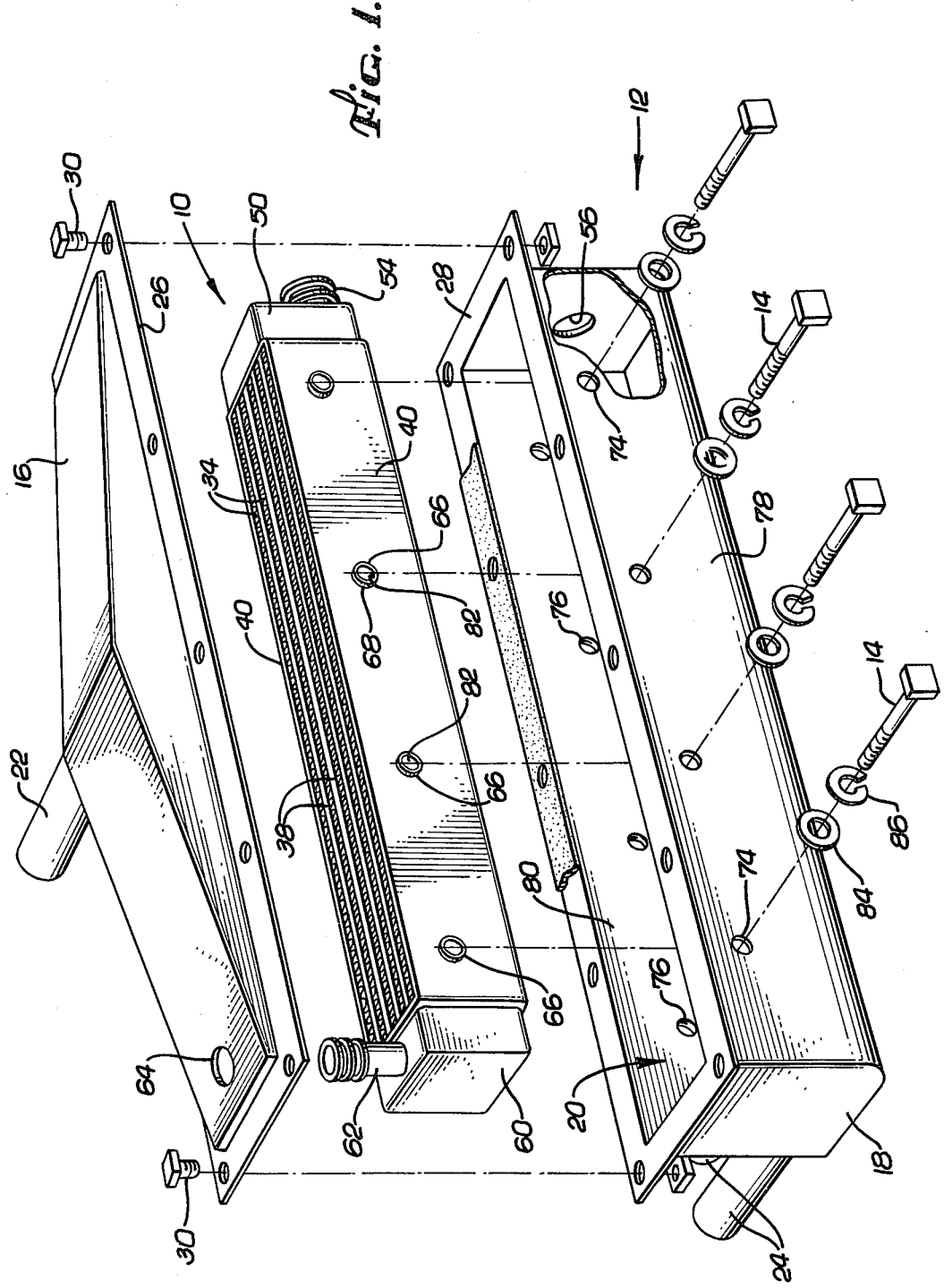
FIG. 1 is an exploded perspective view illustrating mounting of a charge air cooler into the intake manifold of a combustion engine.

A charge air cooler and mounting arrangement embodying the novel features of this invention is illustrated generally in FIG. 1 which depicts a charge air cooler 10 in conjunction with an intake manifold 12 of a combustion engine system. The charge air cooler 10 is adapted for quick and easy mounting within the intake manifold 12 by use of a plurality of mounting bolts 14 wherein heat transfer elements of the charge air cooler are not subjected to substantial mechanical mounting forces.

The charge air cooler 10 and the intake manifold 12 are designed for use with a combustion engine (not shown) which is supplied with compressed ambient air from a supercharger, turbocharger, or the like (also not shown). The intake manifold 12 forms a portion of the flow path through which the compressed air, commonly referred to as charge air, passes on its way to the engine combustion chamber or cylinders, and the charge air cooler is provided for reducing the temperature of the charge air prior to ingestion by the engine. This reduction in temperature of the charge air advantageously increases the charge air density and decreases the overall heat load on the engine for the purpose of increasing overall engine performance and economy.

An exemplary intake manifold 12 for use in the charge air cooler mounting arrangement of this invention is illustrated in detail in FIGS. 1 and 2. As shown, the manifold 12 comprises an upper, generally shell-shaped manifold section 16 and a lower manifold section 18 which cooperate to define a manifold chamber 20 in which the charge air cooler 10 is mounted. The upper manifold section 16 is connected to a charge air supply conduit 22 through which the charge air is supplied from a turbocharger or the like for flow downwardly into the manifold chamber 20 and passage through the charge air cooler 10 prior to discharge to the engine cylinders through a plurality of individual outlet conduits 24. Conveniently, the manifold sections 16 and 18 respectively include mating flanges 26 and 28 through which a plurality of connecting bolts 30 are fastened to connect the manifold sections securely with respect to each other. If desired, a sealing gasket 32 can be interposed between the flanges 26 and 28 to prevent fluid leakage therebetween.

The charge air cooler 10 comprises a unitary heat exchanger structure with a size and shape to fit relatively closely into the lower manifold section 18 of the intake manifold 12. Accordingly, the charge air passing downwardly through the intake manifold is substantially prevented from bypassing the charge air cooler. Instead, the charge air is constrained to flow through an appropriate flow path in the charge air cooler in heat exchange relation with a coolant which is circulated through an additional flow path in the charge air cooler. In this manner, the temperature level of the charge air advantageously may be reduced to increase charge air density and decrease engine heat load.

While the specific construction details of the charge air cooler may vary, a representative charge air cooler is shown in the the drawings in the form of a so-called plate-fin heat exchanger having a heat exchanger core defined by a stacked array of lightweight plate-fin heat transfer elements and lightweight divider plates. More specifically, the cooler includes a heat exchanger core defined by a plurality of first plate-fin elements 34 each formed from a lightweight material having relatively high heat conductive properties, such as a thin copper sheet shaped to have a generally corrugated cross section defining an extended heat transfer surface area. These first plate-fin elements 34 are combined with a plurality of second plate-fin elements 36 which are also formed from a lightweight material having high heat conductive properites, such as a thin copper sheet shaped to have a generally corrugated cross section defining additional extended surface heat transfer areas.

As viewed best in FIGS. 1–3, the plate-fin elements 34 are oriented in an alternating stack or array with the plate-fin elements 36, and the stacked plate-fin elements 34 and 36 are separated from each other by a plurality of relatively thin and lightweight divider plates 38 of a heat conductive material such as copper. The entire stack including the plate-fin elements 34 and 36 and the divider plates 38 is in turn sandwiched between a pair of protective side plates 40. These side plates 40 are also formed from a heat conductive material, such as copper, and advantageously may have a lightweight and thin construction generally corresponding with the divider plates 38.

The plate-fin elements 34 are arranged with their corrugations extending generally vertically as shown in FIG. 3 whereby these elements 34 cooperate with the divider plates 38 and the side plates 40 to define a plurality of vertically extending, relatively small flow openings 42. The flow openings 42 constitute a first flow path for passage of the charge air downwardly through the heat exchanger core when the charge air cooler 10 is mounted within the intake manifold 12.

The second plate-fin elements 36 are arranged with their corrugations extending generally in a longitudinal direction from one end of the heat exchanger core to the other and generally at a right angle to the flow openings 42 defining the charge air flow path. These latter plate-fin elements 36 cooperate with the divider plates 38 to define a plurality of longitudinally extending and relatively small flow openings 44 which provide a second flow path for passage of the coolant in heat exchange relation with the charge air. Importantly, to prevent fluid leakage between the two flow paths, the upper and lower longitudinal margins of the second plate-fin elements 36 are bounded by longitudinally extending header bars 46 positioned between the associated divider plates 38.

Coolant is supplied to one end of the charge air cooler 10 for flow through the longitudinal flow openings 44 and discharge therefrom at the opposite end of the cooler. More particularly, a generally shell-shaped header tank 50 is supported in a conventional manner at one end of the side plates 40 and the header bars 46 to provide a plenum 52 in open communication with the adjacent ends of the longitudinal flow openings 44. The coolant, such as liquid coolant pumped from an engine radiator-type cooling system, is supplied into this header tank 50 through an inlet tube 54 having a size and shape for close reception through an opening 56 (FIG. 1) in the lower manifold section 18 when the charge air cooler is mounted within the intake manifold. If desired, passage of the inlet tube 54 through this opening 56 can be sealed by use of an appropriate gasket (not shown).

The coolant discharged from the longitudinal flow openings 44 is collected within a plenum 58 defined by a generally shell-shaped header tank 60 supported in a conventional manner at the opposite ends of the side plate 40 and the header bars 46. The collected coolant is then guided away from the charge air cooler for return through an outlet tube 62 to the radiator (not shown) of an engine cooling system. This outlet tube 62 is shaped to fit through an opening 64 in the upper manifold section 16, and passage of the outlet tube 62 through the opening 64 can be sealed by use of an appropriate gasket (not shown).

The component parts of the charge air cooler 10 as described above are all formed from a suitable material, such as copper, aluminum, or the like, having an acceptably high thermal conductivity for efficient transfer of heat between the charge air and the coolant. Moreover, the component parts are all selected from a material compatible with manufacturing techniques for joining them together to form the unitary construction illustrated in FIG. 1. For example, it is desirable to form the charge air cooler 10 from copper components and to subject the components to a brazing process to provide the unitary cooler construction which can be mounted as a unit into the air intake manifold 12.

In accordance with the invention, the charge air cooler includes structural members which cooperate with the mounting bolts 14 to permit rapid and easy mounting of the cooler into the engine intake manifold 12. The structural members are advantageously relatively small and compact in size, yet function to support the mechanical mounting forces applied by the bolts 14. In this manner, mounting forces are substantially prevented from acting upon the plate-fin elements 34 or 36, the divider plates 38, or the side plates 40 to permit all of these components to be structurally lightweight in material and thickness.

The structural members are provided in the form of a plurality of relatively rigid sleeves 66 extending transversely through the heat exchanger core wherein these sleeves are formed from a material compatible for connection to the core as by brazing during manufacture of the charge air cooler. Each mounting sleeve 66, as viewed in detail in FIGS. 2 and 4, extends transversely through a passage defined in the core by an aligned set of openings 68, 69, 70, and 71 formed respectively in the side plates 40, the plate-fin elements 34, the divider plates 38, and the plate-fin elements 36. Importantly, however, each mounting sleeve 66 is solidly anchored to the side plates 40 as by brazing. Moreover, each sleeve is anchored to the divider plates 38 by a plurality of annular sealing rings 72 carried about the sleeve at axial positions corresponding with the second plate-fin elements 36 and projecting radially outwardly therefrom between the adjacent pair of divider plates 38. These sealing rings 72 are secured to the sleeve 66 and the divider plates 38 in a leak-free manner, such as by brazing, to prevent intermixture of the fluids in the vicinity of the mounting sleeve. Conveniently, as shown, the openings 71 in the second plate-fin elements 36 are enlarged with respect to the openings 70 in the divider plates 38 to permit relatively free flow of coolant about the sealing rings 72 toward the opposite end of the core.

As shown in FIGS. 1 and 2, the charge air cooler 10 fits into the lower manifold section 18 of the intake manifold 12, and the mounting bolts 14 are passed through the lower manifold section and the charge air cooler to secure the cooler in place. For this purpose, the lower manifold section 18 is provided with sets of aligned bolt-receiving holes 74 and 76 formed in the opposite walls 78 and 80 thereof at longitudinal positions corresponding with each mounting sleeve 66. Each one of the mounting bolts 14 is received through the associated hole 74 in the wall 78 and further through the bore 82 of the mounting sleeve 66 for passage through the aligned hole 76 in the opposite wall 80. In the embodiment shown, the holes 76 in the opposite wall 80 are threaded to permit threaded fastening of the mounting bolts 14 directly to the manifold wall 80. If desired, flat washers 84 and/or lock washers 86 can be used to prevent the bolts 14 from working loose during use.

The mounting bolts 14 are tightened by advancing them into the threaded holes 76 sufficiently to draw the opposite walls 78 and 80 of the lower manifold section 18 into bearing engagement with the charge air cooler and thereby securely mount the charge air cooler into the intake manifold. Importantly, the mounting sleeves 66 have a length at least as great as the width of the cooler and preferably sufficient to project slightly beyond the opposite exterior surfaces of the cooler as defined by the external planes of the side plates 40. With this construction, the manifold walls 78 and 80 are drawn into bearing engagement with the projecting ends of the mounting sleeves 66 and not into bearing engagement with the side plates 40 or other portions of the cooler which may not have sufficient structural strength to withstand the mounting forces. Accordingly, mechanical forces arising by mounting of the charge air cooler into the intake manifold are applied to the mounting sleeves 66 substantially without any loading of heat transfer elements of the heat exchanger core.

The mounting arrangement illustrated in FIGS. 1–4 is particularly advantageous when the manifold wall 80 comprises an inboard wall disposed adjacent the engine and thus substantially inaccessible when the intake manifold 12 is mounted on the engine. The mounting sleeves 66 permit use of elongated mounting bolts 14 which pass through the accessible, outboard wall 78 and entirely through the charge air cooler for threaded fastening into the inboard wall 80 without requiring additional bolts or nuts at the inboard side of the manifold. The charge air cooler may therefore be mounted within and/or removed from the intake manifold 12 both quickly and easily while the intake manifold is in place on the engine.

The mounting arrangement of this invention further permits use of relatively thin divider plates 38 and side plates 40, since these plates are not required to support mechanical mounting loads. This advantageously minimizes the volume occupied by these plates to correspondingly permit a larger proportion of the charge air cooler volume to be occupied by corrugated or other extended surface heat transfer elements and thereby achieve improvements in cooler heat transfer capacity. In addition, the thin divider plates 38 and side plates 40 tend to have coefficients of thermal expansion more nearly matching the coefficients of the thin plate-fin elements 34 and 36, resulting in an overall reduction of thermal stress in the cooler during temperature fluctuations on start-up or shut down.

One modified mounting arrangement is illustrated by way of example in FIG. 5, wherein components identical to those of FIGS. 1–4 are designated by common reference numerals. As illustrated, one or more mounting sleeves 166 are carried by a charge air cooler 10 having a heat exchanger core defined by a stack of plate-fin elements 34 and 36, divider plates 38, and side plates 40. This charge air cooler is sized and shaped for reception into an intake manifold 12 wherein a lower manifold section 118 has opposite side walls 178 and 180 with bolt-receiving holes 174 and 176 formed respectively therein. However, in this embodiment, the bore 182 of the mounting sleeve 166 is internally threaded for reception of a pair of mounting bolts 114 and 115 into the opposite ends thereof.

More particularly, the bolt 114 is received through the hole 174 in the manifold wall 178 and is fastened directly into the mounting sleeve 166. In a similar manner, the other bolt 115 is received through the hole 176 in the manifold wall 180 and is fastened directly into the opposite end of the mounting sleeve 166. Both bolts 114 and 115 are tightened to draw the manifold walls 178 and 180 into bearing engagement with the opposite ends of the sleeve 166, which project beyond the side plates 40, to securely anchor the charge air cooler within the intake manifold.

The mounting arrangement of this invention thus provides an improved charge air cooler which can be mounted quickly and easily into an intake manifold, wherein the cooler has heat transfer components which are substantially isolated from mechanical mounting forces. Moreover, if desired, mounting of the cooler can be accomplished from one side of the manifold by use of elongated mounting bolts which pass entirely through the cooler and fasten into the opposite side of the manifold.

A variety of modifications and improvements to the invention described and shown herein are believed to be apparent to one skilled in the art. Accordingly, no limitation on the invention is intended, except as set forth in the appended claims.

What is claimed is:

1. A charge air cooler mounting arrangement for mounting a charge air cooler within an engine intake manifold, comprising:
    a plate-fin charge air cooler having a heat exchanger core with a stacked plurality of generally parallel plate-fin heat transfer elements defining a first flow path and a second flow path generally parallel with said first flow path for respective passage of charge air and coolant in heat transfer relation with each other;
    at least one relatively rigid mounting sleeve carried by said charge air cooler to extend perpendicularly of said plate-fin elements and having a length at least as great as the width of said charge air cooler;
    an engine intake manifold having a chamber formed therein for reception of said charge air cooler with said mounting sleeve extending transversely between a pair of manifold side walls bounding opposite sides of the chamber;
    means extending through at least one of said manifold side walls and into said mounting sleeve for securing said mounting sleeve with respect to said one side wall and thereby secure said charge air cooler within said manifold; and
    means coupled between said plate-fin elements and said mounting sleeve for preventing leakage between said first and second flow paths in the vicinity of said mounting sleeve.

2. The charge air cooler mounting arrangement of claim 1 wherein said manifold side walls have an aligned pair of openings formed therein, and wherein said securing means comprises a bolt received through the opening in one of said manifold side walls and further through said mounting sleeve and the opening in the other of said manifold side walls.

3. The charge air cooler mounting arrangement of claim 2 wherein the opening in the other of said manifold side walls is threaded for threaded reception of said bolt.

4. The charge air cooler mounting arrangement of claim 3 wherein said one of said manifold side walls is on an outboard side of said manifold and said other of said manifold side walls is on an inboard side of said manifold.

5. The charge air cooler mounting arrangement of claim 1 wherein said mounting sleeve projects slightly from the surface planes of said charge air cooler at the opposite sides of said charge air cooler.

6. The charge air cooler mounting arrangement of claim 1 wherein said mounting sleeve is internally threaded, and wherein said securing means comprises a bolt fastened into said sleeve.

7. The charge air cooler mounting arrangement of claim 6 wherein said securing means comprises a pair of bolts extending through said manifold side walls and fastened respectively into opposite ends of said sleeve.

8. The charge air cooler mounting arrangement of claim 1 including a plurality of said mounting sleeves carried by said charge air cooler, and a plurality of said securing means for securing said mounting sleeves with respect to said manifold side walls and thereby secure said charge air cooler within said manifold.

9. The charge air cooler mounting arrangement of claim 1 wherein said heat exchanger core includes means coupling a liquid coolant for flow through said second flow path.

10. The charge air cooler mounting arrangement of claim 1 wherein said heat transfer elements comprise an alternating stack of first plate-fin elements and second plate-fin elements, and a plurality of divider plates each disposed between an adjacent pair of said first and second plate-fin elements, said first and second plate-fin elements and said divider plates having aligned openings formed therein for reception of said mounting sleeve, said leakage preventing means being coupled between said mounting sleeve and each of said divider plates.

11. The charge air cooler mounting arrangement of claim 10 wherein said leakage preventing means comprises a plurality of annular sealing rings carried about said mounting sleeve and secured thereto at axially spaced position generally in common with said second plate-fin elements, said sealing rings each projecting radially outwardly from said mounting sleeve between a pair of said divider plates for connection thereto.

12. The charge air cooler mounting arrangement of claim 11 wherein the openings formed in said second plate-fin elements are radially enlarged with respect to said sealing rings.

13. The charge air cooler mounting arrangement of claim 10 wherein said stack of first and second plate-fin elements and said divider plates are sandwiched between a pair of side plates, said mounting sleeve having a length to project slightly beyond the exterior planes of said side plates.

14. A charge air cooler mounting arrangement, comprising:

a plate-fin charge air cooler including a heat exchanger core having a stacked plurality of generally parallel plate-fin heat transfer elements defining first and second generally parallel flow paths for respective passage in heat transfer relation of charge air and a coolant;

a plurality of relatively rigid mounting sleeves carried by said heat exchanger core each to extend generally perpendicularly of said plate-fin elements and having a length to project at least slightly from the opposite sides of said heat exchanger core;

an intake manifold having a chamber formed therein for reception of said heat exchanger core with said mounting sleeves extending transversely between a pair of manifold side walls bounding opposite sides of the chamber;

means extending through said side walls and into each of said mounting sleeves for securing said heat exchanger core within said manifold and for bringing said side walls into bearing engagement with the opposite ends of said mounting sleeves; and means coupled between said plate-fin elements and each of said mounting sleeves for preventing leakage between said first and second flow paths in the vicinity of said mounting sleeves.

15. The charge air cooler mounting arrangement of claim 14 wherein said plate-fin heat transfer elements comprise an alternating stack of first plate-fin elements and second plate-fin elements, and a plurality of divider plates each disposed between an adjacent pair of said first and second plate-fin elements, said first and second plate-fin elements and said divider plates having aligned openings formed therein for reception of said mounting sleeves, said leakage preventing means being coupled between said mounting sleeves and said divider plates.

16. The charge air cooler mounting arrangement of claim 15 wherein said leakage preventing means comprises a plurality of annular sealing rings carried about each of said mounting sleeves and secured thereto at axially spaced positions generally in common with said second plate-fin elements, said sealing rings each projecting radially outwardly from the associated mounting sleeve between a pair of said divider plates for connection thereon.

17. The charge air cooler mounting arrangement of claim 16 wherein the openings formed in said second plate-fin elements are radially enlarged with respect to said sealing rings.

18. A charge air cooler mounting arrangement, comprising:

a charge air cooler including a plate-fin heat exchanger core defined by an alternating stack of first plate-fin elements and second plate-fin elements and a plurality of divider plates each disposed between an adjacent pair of said first and second plate-fin elements, said first plate-fin elements and said divider plates cooperating to form a first flow path for charge air, and said second plate-fin elements and said divider plates cooperating to form a second flow path for a coolant in heat transfer relation with the charge air;

at least one relatively rigid mounting sleeve carried by said heat exchanger core to extend transversely therethrough and having a length at least as great as the width of said core;

a plurality of annular sealing rings carried about said mounting sleeve and each projecting radially therefrom between a pair of said divider plates, said rings each being sealingly connected to said sleeve and said associated pair of divider plates to prevent leakage of fluid between said first and second flow paths;

an intake manifold having a chamber formed therein for reception of said heat exchanger core with said mounting sleeve extending transversely between a pair of manifold side walls bounding opposite sides of the chamber; and means extending through said side walls and into said mounting sleeve for securing said heat exchanger core within said manifold and for bringing said side walls into bearing engagement with the opposite ends of said mounting sleeve.

19. The charge air cooler mounting arrangement of claim 18 wherein said mounting sleeve projects slightly from the surface planes of said heat exchanger core at the opposite sides of said heat exchanger core.

20. The charge air cooler mounting arrangement of claim 18 wherein said sealing rings are disposed at axially spaced positions about said mounting sleeve, each of said sealing rings being positioned generally in a plane corresponding to a respective one of said second plate-fin elements.

21. The charge air cooler mounting arrangement of claim 20 wherein each of said second plate-fin elements has an opening formed therein for accommodating reception therethrough of said mounting sleeve and the associated one of said sealing rings, said opening in said each of said second plate-fin elements being of larger diameter than the diameter of said sealing rings.

22. A charge air cooler for mounting within an engine intake manifold, comprising:

a plate-fin heat exchanger core having an alternating stacked plurality of generally parallel first and second plate-fin elements and a plurality of generally parallel divider plates each disposed between an adjacent pair of said first and second plate-fin elements, said first plate-fin elements cooperating with said divider plates to define a first flow path and said second plate-fin elements cooperating with said divider plates to define a second flow path generally parallel with said first flow path, said first flow path and second flow path being for respective passage in heat transfer relation of charge air and a coolant;

at least one relatively rigid mounting sleeve carried by said heat exchanger core to extend transversely thereof and having a length at least as great as the width of said heat exchanger core; and a plurality of annular sealing rings carried about said sleeve in axially spaced positions each between a respective pair of said divider plates in a plane corresponding with a respective one of said second plate-fin elements, said sealing rings being secured to said sleeve and said divider plates to prevent leakage between said first and second flow paths.

23. The charge air cooler of claim 22 wherein said mounting sleeve projects slightly from the surface planes of said heat exchanger core at the opposite sides of said heat exchanger core.

24. The charge air cooler of claim 22 including a plurality of said mounting sleeves carried by said heat exchanger core each to extend generally transversely thereof and generally in parallel with each other.

* * * * *